US012704902B2

(12) United States Patent
Braley et al.

(10) Patent No.: US 12,704,902 B2
(45) Date of Patent: Aug. 11, 2026

(54) METHODS AND SYSTEMS FOR CONTROLLING VEHICLE FUNCTIONS WITH GAZE

(71) Applicant: HUAWEI TECHNOLOGIES CO., LTD., Shenzhen (CN)

(72) Inventors: Sean Brian Braley, Orillia (CA); Roeland Petrus Hubertus Vertegaal, Perth Road (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/644,326

(22) Filed: Apr. 24, 2024

(65) Prior Publication Data

US 2025/0335023 A1 Oct. 30, 2025

(51) Int. Cl.
*G06F 3/01* (2006.01)
*B60K 35/10* (2024.01)
(Continued)

(52) U.S. Cl.
CPC .............. *G06F 3/013* (2013.01); *B60K 35/10* (2024.01); *B60K 35/22* (2024.01); *B60K 35/235* (2024.01);
(Continued)

(58) Field of Classification Search
CPC ......... G06F 3/013; G06F 3/167; B60K 35/10; B60K 35/22; B60K 35/235;
(Continued)

(56) References Cited

U.S. PATENT DOCUMENTS 5,850,211 A 12/1998 Tognazzini
7,572,008 B2 * 8/2009 Elvesjo ................. A61B 3/113 396/51

(Continued)

FOREIGN PATENT DOCUMENTS

CN 104838335 A 8/2015
WO 2021136495 A1 7/2021

OTHER PUBLICATIONS

International Search Report dated Jun. 16, 2025 for International Application No. PCT/CN2025/089770.

(Continued)

*Primary Examiner* — Douglas Wilson
(74) *Attorney, Agent, or Firm* — Tim Tingkang Xia, Esq.; Troutman Pepper Locke LLP

(57) ABSTRACT

A system for gaze-based control of vehicle functions and related methods includes eye contact sensors for monitoring one or both eyes of a user, manual input devices, and circuits configured for tracking a gaze of a user located within a vehicle, identifying a gaze condition from the eye contact sensors in response to determining the gaze of the user is directed to an object of interest in the vehicle for at least a predetermined dwell-time, receiving a manual input from the manual input devices, activating a command interaction associated with the object of interest in response to identifying the gaze condition and receiving the manual input, receiving, while the command interaction is active, a command associated with the object of interest from the user, and initiating a vehicle function based on the received command.

19 Claims, 8 Drawing Sheets

(51) Int. Cl.
*B60K 35/22* (2024.01)
*B60K 35/235* (2024.01)
*G06F 3/16* (2006.01)

(52) U.S. Cl.
CPC ........ *G06F 3/167* (2013.01); *B60K 2360/148* (2024.01); *B60K 2360/149* (2024.01); *B60K 2360/164* (2024.01); *B60K 2360/167* (2024.01); *B60K 2360/18* (2024.01)

(58) Field of Classification Search
CPC ........ B60K 2360/148; B60K 2360/164; B60K 2360/167; B60K 2360/18; B60K 2360/149
See application file for complete search history.

(56) References Cited

U.S. PATENT DOCUMENTS

| | | | | |
|---|---|---|---|---|
| 9,244,527 | B2 | 1/2016 | Lathrop et al. | |
| 10,373,617 | B2 | 8/2019 | Piernot et al. | |
| 2010/0238280 | A1* | 9/2010 | Ishii | G02B 27/01 348/77 |
| 2015/0135132 | A1* | 5/2015 | Josephson | H04W 4/021 715/784 |
| 2019/0318181 | A1 | 10/2019 | Katz et al. | |
| 2021/0255700 | A1* | 8/2021 | Cederlund | G02B 27/01 |
| 2023/0094073 | A1* | 3/2023 | Ko | G06V 20/20 345/156 |

OTHER PUBLICATIONS

Vertegaal, Roel. "Attentive user interfaces." Communications of the ACM 46.3 (2003): 30-33.

Dickie et al. "Eye contact sensing glasses for attention-sensitive wearable video blogging." CHI'04 extended abstracts on Human factors in computing systems. 2004.

Penkar et al. "Designing for the eye: design parameters for dwell in gaze interaction." Proceedings of the 24th australian computer-human interaction conference. 2012.

Jacob, Robert JK. "The use of eye movements in human-computer interaction techniques: what you look at is what you get." ACM Transactions on Information Systems (TOIS) 9.2 (1991): 152-169.

Shell et al. "EyePliances: attention-seeking devices that respond to visual attention." CHI'03 extended abstracts on Human factors in computing systems. 2003.

* cited by examiner

METHODS AND SYSTEMS FOR CONTROLLING VEHICLE FUNCTIONS WITH GAZE

TECHNICAL FIELD

The present disclosure pertains generally to methods and systems for controlling computing devices in a vehicle and in particular to methods and systems for controlling computing devices in a vehicle with gaze.

BACKGROUND

A person's eye movement may closely link to their attention, behavior, and cognition. Eye gaze estimation or eye tracking is a computer vision task that has received significant interest in recent years. Gaze estimation has been widely applied, especially within the field of human-computer interaction. Examples include gaze control for hands-free interaction, gaze control for augmenting manual interactions, user attention analysis, understanding human behavior, augmented/virtual reality rendering.

Associated methods may detect if a user is gazing at a particular region of interest, typically a distinct object, which may be suitable for vehicle related applications. Within the automotive field, gaze tracking may be used to detect driver alertness, wherein features of the driver that indicate alertness may be measured in addition to monitoring a gaze point of the user to determine the percentage of time spent outside of the main driving task.

Alternative approaches use some method for a "click" or trigger, such as blinking of the eye. This is generally inadvisable, as it involves closing the eye, a typically involuntary action. There remains a need for improved gaze interactions, especially in vehicle related applications, where the attention and focus of the user are otherwise required for safe operation.

SUMMARY

In some embodiments disclosed herein, methods and systems for gaze-based control of vehicle track a gaze of a user located within the vehicle for obtaining and using a combination of conditions relating to user gaze and manual inputs for interacting with the system and it relates to objects within the vehicle.

In some embodiments disclosed herein, combining the detection of a gazed-at object, manual input triggering via a button press on the steering wheel, and voice-interactions for command may provide a system that enables a user to quickly and efficiently give commands to a multitude of devices in their vehicle.

Utilizing a short-dwell-time gaze-and-click, the system may quickly activate, without being overly responsive and Midas touch related issues may be avoided. Using gaze and selection methods and systems disclosed herein, voice-based commands are given context for operation. As a result, spoken commands can be shorter and more meaningful, as the user does not need to state on which device an action should take place.

Further, users may activate and interact with systems without removing hands from steering wheel resulting in increased safety of operation.

In a broad aspect of the present disclosure, a method of gaze-based control of vehicle functions comprises: tracking, by a sensor associated with the vehicle, a gaze of a user located within the vehicle; identifying a first gaze condition in response to determining the gaze of the user is directed to a first object of interest in the vehicle for at least first predetermined dwell-time; receiving a first manual input from the user, the first manual input associated with the vehicle; activating a first command interaction associated with the first object of interest in response to identifying the first gaze condition and receiving the first manual input; receiving, while the first command interaction is active, a first command associated with the first object of interest from the user; and initiating a first vehicle function based on the received first command.

In some embodiments, activating the first command interaction further comprises providing the user a visual or an audible indication that the first command interaction is activated.

In some embodiments, the first command is a first voice command.

In some embodiments, the method further comprises: identifying a second gaze condition in response to determining the gaze of the user is directed to a second object of interest in the vehicle for at least a second predetermined dwell-time; receiving a second manual input from the user, the second manual input associated with the vehicle; activating a second command interaction associated with the second object of interest in response to identifying the second gaze condition and receiving the second manual input; receiving, while the second command interaction is active, a second command associated with the second object of interest from the user; and initiating a second vehicle function based on the received second command.

In some embodiments, the method further comprise: identifying a cancellation gaze condition in response to determining the gaze of the user is directed to the first object of interest for at least a cancellation predetermined dwell-time; receiving a cancellation manual input from the user, the cancellation manual input associated with the vehicle; and deactivating the first command interaction in response to identifying the cancellation gaze condition and receiving the cancellation manual input.

In some embodiments, the method further comprises deactivating the first command interaction in response to determining an absence of the first command prior to expiration of a time-out period.

In some embodiments, the first object of interest is at least one of a gauge cluster, a dash display, a heads-up display, and an infotainment console.

In a broad aspect of the present disclosure, a method of gaze-based control of vehicle functions comprises: tracking, by a sensor associated with the vehicle, a gaze of a user located within the vehicle; identifying a first gaze condition in response to determining the gaze of the user is directed to a first object of interest in the vehicle for at least a first predetermined dwell-time; receiving a first manual input from the user, the first manual input associated with the vehicle; identifying a display device gaze condition in response to determining the gaze of the user is directed to a display device in the vehicle for at least a device predetermined dwell-time; activating a first command interaction in the display device associated with the first object of interest in response to identifying both the first gaze condition and the display device gaze condition and receiving the first manual input; receiving, while the first command interaction is active, a first command associated with the first object of interest from the user; and initiating a first vehicle function based on the received first command.

In some embodiments, activating a first command interaction further comprises providing the user a visual or audible indication that the first command interaction is activated.

In some embodiments, the display device is at least one of a gauge cluster, a dash display, a heads-up display, and an infotainment console.

In some embodiments, the method further comprises: identifying a cancellation gaze condition in response to determining the gaze of the user is directed to the first object of interest for at least a cancellation predetermined dwell-time; receiving a cancellation manual input from the user, the cancellation manual input associated with the vehicle; and deactivating the first command interaction in response to identifying the cancellation gaze condition and receiving the cancellation manual input.

In some embodiments, the method further comprises deactivating the first command interaction in response to determining an absence of the first command prior to expiration of a time-out period.

In some embodiments, the method further comprises: identifying a pinning gaze condition in response to determining the gaze of the user is directed to the first object of interest for at least a pinning dwell-time; receiving a pinning manual input from the user, the pinning manual input associated with the vehicle; and adding a pinned representation of the first object of interest in the display device in response to identifying the pinning gaze condition and receiving the pinning manual input.

In some embodiments, the method further comprises: identifying a pinning removal gaze condition in response to determining the gaze of the user is directed to the pinned representation for at least a removal dwell-time; receiving a pinning removal manual input from the user, the pinning removal manual input associated with the vehicle; and removing the pinned representation in the display device in response to identifying the pinning removal gaze condition and receiving the pinning removal manual input.

In some embodiments, the method further comprises: identifying a pinned access gaze condition in response to determining the gaze of the user is directed to the pinned representation for at least a pinned access dwell-time; receiving a pinned access manual input from the user, the pinned access manual input associated with the vehicle; activating a pinned command interaction in the display device in response to identifying the pinned access gaze condition and receiving the pinned access manual input; receiving, while the pinned command interaction is active, a pinned command associated with the pinned representation from the user; and initiating a pinned vehicle function based on the received pinned command.

In some embodiments, the method further comprises: receiving a notification in the display device; identifying a notification gaze condition in response to determining the gaze of the user is directed to the display device for at least a notification predetermined dwell-time; receiving a notification manual input from the user, the notification manual input associated with the vehicle; and displaying contents of the notification in the display device in response to identifying the notification gaze condition and receiving the notification manual input.

In a broad aspect of the present disclosure, a system for gaze-based control of vehicle functions comprises: one or more eye contact sensors for monitoring one or both eyes of a user; one or more manual input devices; and one or more processors configured to perform operations including: tracking a gaze of a user located within a vehicle; identifying a first gaze condition from the one or more eye contact sensors in response to determining the gaze of the user is directed to a first object of interest in the vehicle for at least a first predetermined dwell-time; receiving a first manual input from the one or more manual input devices; activating a first command interaction associated with the first object of interest in response to identifying the first gaze condition and receiving the first manual input; receiving, while the first command interaction is active, a first command associated with the first object of interest from the user; and initiating a first vehicle function based on the received first command.

In some embodiments, the one or more processors are configured to perform further operations including: identifying a second gaze condition from the one or more eye contact sensors in response to determining the gaze of the user is directed to a second object of interest in the vehicle for the predetermined dwell-time; receiving a second manual input from the one or more manual input devices; activating a second command interaction associated with the second object of interest in response to identifying the second gaze condition and receiving the second manual input; receiving, while the second command interaction is active, a second command associated with the second object of interest from the user; and initiating a second vehicle function based on the received second command.

In some embodiments, the one or more processors are configured to perform further operations including: identifying a cancellation gaze condition from the one or more eye contact sensors in response to determining the gaze of the user is directed to the first object of interest for at least a cancellation predetermined dwell-time; receiving a cancellation manual input from the one or more manual input devices; and deactivating the first command interaction in response to identifying the cancellation gaze condition and receiving the cancellation manual input.

In some embodiments, the system is further configured to operate with at least one of a gauge cluster, a dash display, a heads-up display, and an infotainment console.

BRIEF DESCRIPTION OF THE DRAWINGS

For a more complete understanding of the disclosure, reference is made to the following description and accompanying drawings, in which.

Throughout the appended drawings, like features are identified by like reference numerals.

DETAILED DESCRIPTION

Figure 1:
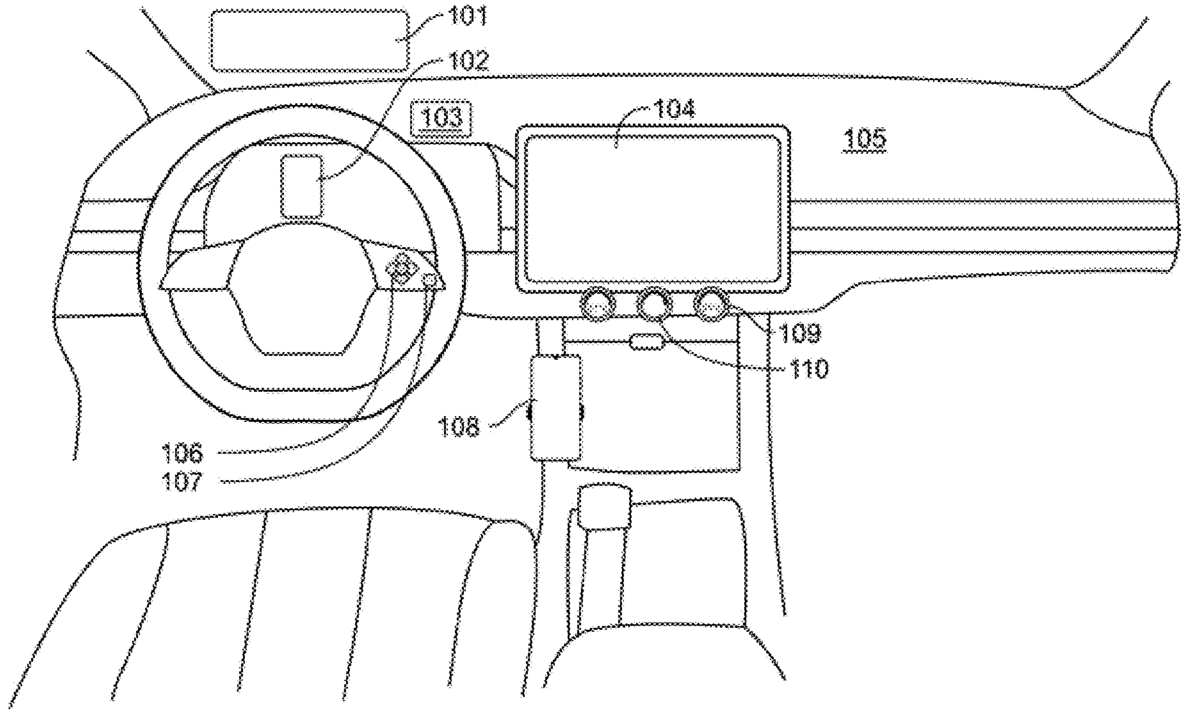
FIG. 1 is a schematic diagram of an exemplary interior of a vehicle.

Unless otherwise defined, all technical and scientific terms used herein generally have the same meaning as commonly understood by one of ordinary skill in the art to which this disclosure pertains. Exemplary terms are defined below for ease in understanding the subject matter of the present disclosure.

The term "a" or "an" refers to one or more of that entity; for example, "a module" refers to one or more modules or at least one module. As such, the terms "a" (or "an"), "one or more" and "at least one" are used interchangeably herein. In addition, reference to an element or feature by the indefinite article "a" or "an" does not exclude the possibility that more than one of the elements or features are present, unless the context clearly requires that there is one and only one of the elements. Furthermore, reference to a feature in the plurality (e.g., modules), unless clearly intended, does not mean that the modules or methods disclosed herein must comprise a plurality.

The expression "and/or" refers to and encompasses any and all possible combinations of one or more of the associated listed items (e.g. one or the other, or both), as well as the lack of combinations when interrupted in the alternative (or).

The term "to attend" or "attending" may be used herein to refer to eye tracking interactions for indicating that a user is looking at a particular device or a part of a device. For example, a user may be attending to a display or an icon, representation, and/or the like thereon.

The term "dashboard" may be used herein to refer to an instrument cluster area of a vehicle, car or motor vehicle. The dashboard may comprise a display with one or more manual controls such as buttons or may be entirely digital and may use a touch screen interface.

The term "application" or "app" may be used herein to refer to a program that may comprise a graphical component that is accessible to the end user. Apps may be represented in a user interface of a system, such as a smart device, through an icon.

The term "infotainment device" may be used herein to refer to a multimedia device that may rest on a car dashboard, typically in an area in the middle that is accessible to both front-seat passengers. Contains a display capable of running at least one "app".

A driver monitoring system may be a computerized mechanism that detects, at least, driver alertness and attentiveness by various means, in order to alert said driver if they are considered hazardous.

Gaze tracking or eye contact sensing may refer to methods for determining if a user is looking, or not looking, at a specific region of interest, typically an object.

The term "pinning" may be used in reference to an app or a function from an app, referring to attaching semi-fixed a portion of user interface in a specific region or location.

A person's eye movement may be closely linked to their attention, behavior, and cognition. Eye gaze estimation or eye tracking may refer to a computer vision (CV) task. Gaze estimation may be used, especially within the field of human-computer interaction. Examples include gaze control for hands-free interaction, gaze control for augmenting manual interactions, user attention analysis, understanding human behavior, augmented/virtual reality (AR/VR) rendering.

Generally, gaze estimation may be used with reference to some frame, such as x-y coordinates on a smartphone or display. Alternatively, in the case of a head-mounted gaze tracker, this may be refer to an x-y coordinate relative to some world-facing camera view. In this case, the borders of a device may be detected and gaze projected within it. Some gaze estimation technologies may be accurate to approximately 1°.

Alternatively, methods may be used wherein detection of a user gazing at a particular region of interest is observed, such as a distinct object. These methods of detection may be robust and may be suitable for use in automotive use-cases. Gaze tracking may also be referred to as eye contact sensing.

Within the automotive field, gaze tracking may be used to detect driver alertness in driver monitoring systems (DMSs). Such systems may measure either features on the driver that indicate alertness (including, for example, eye-droop, etc.) or they may measure the gaze point of the user, and determine the percentage of time spent outside of the main driving task, or both.

Gaze interactions may use dwell-time as a secondary input as stimulus to the system. This is primarily due to an effect known as "Midas touch" but may result in a system that is overly responsive. Oppositely, a system that uses too long of a dwell-time may appear unresponsive. As such, a dwell time close to the human response time, on the order of 200 ms, may be used.

Alternative approaches may use some method for a click or trigger, such as blinking of the eye. This is generally inadvisable in a vehicle control use-case, as it involves closing the eye, a typically involuntary action.

Attentive user interfaces (AUIs) are interfaces that leverage the user's attention to facilitate interactions. They do this by sensing the user's attention, primarily through eye-fixations, and then reasoning about this attention. By determining the user's attention, devices may communicate this to other devices, and negotiate turn-taking. In building attentive user interfaces, gaze data may be utilized indirectly, allowing for an appreciable benefit to the user, without the issues caused by traditional, gaze-activated interactions.

Gaze tracking for interactions within automobiles may be used for example to automatically configure a display device, or combined with gestures to enable hands-free interactions.

Control of in-car devices may be performed by means of look and gesture. Gaze input is used to select a device (such as the infotainment screen), and then touch-redirection or input-redirection techniques may be used to send touch 2D on arbitrary locations (such as a surface of the vehicle or the user's leg).

Eye tracking may be used with a linear assortment of buttons, and in-air gestures for control, such as for use with self-driving vehicles.

Relocating gestures from the device, to an arbitrary surface that is not the steering wheel does not remove the problem of the driver removing their hands from the control device of the car. In addition to this, the same problem of continual eyes-on-target during the user input remains. That is, while the user is performing the action, their eyes will remain off the road.

In-air gestures are inherently limited, as they can cause unwanted reactions while the user is driving the car, resulting in a mental overload for the driver, which can lead to accidents.

In a modern car environment, a user may have a dash-display, infotainment unit, a heads-up displays (HUDs), a phone, and additional vehicle controls all within their field of view. Additionally, modern vehicles often have a mechanism for receiving and understanding the user's spoken commands. However, without gaze tracking or eye-contact sensing, there is no method for determining the intent of the user's spoken command.

Embodiments of methods and systems disclosed herein may be for controlling any number of electronic, computer, and/or the like devices and interfaces. Such controls may include basic car functions such as climate control, including temperature, heating/cooling mode and fan speed. This may also include more advance car functions such as performance tuning or adjusting/selecting drive modes. This may further include integrated applications such as media, radio, and/or navigation systems. Applications running and/or interfacing on a secondary device such as a media device, radio device, navigation device, and/or a smartphone may also be controlled.

In addition to controlling features, embodiments of methods and systems disclosed herein may be for navigating, configuring, using and/or the like the system itself or its interface.

HUDs and/or dash-displays are typically configurable only while the vehicle is stationary. In some cases, a pre-determined number of items may be scrolled through using commands available to the user. In this case, it poses a risk to the user who must attend to the visual object while they are scrolling, until they reach the desired item. Alternatively, if the item has not been pre-configured, the user may need to stop the vehicle to add it to the configuration.

Gestural interactions may be imprecise, and may require correction, and may, as a result, distract the driver.

In some embodiments disclosed herein, a method utilizes one or more eye-contact sensor(s), or suitably calibrated gaze-tracker, in the situation of operating a motor vehicle to control car and device functions. Manual input may be considered to include the action of pressing the button 107 on the steering wheel.

Embodiments disclose herein comprise methods for: starting a voice interaction with a device based on gaze and manual input, performing a continuous voice operation across two or more devices based on gaze and manual input, cancelling a voice interaction with a device with gaze and manual input, control of devices without voice by means of gaze and directional controls, dynamic visual elements located in the gauge cluster, HUD, or infotainment console based on gaze, control of linked system for dynamic visual elements in the gauge closer, HUD, or infotainment console based on gaze and directional controls, and arranging dynamic visual elements located in the gauge cluster, HUD, or infotainment console based on gaze and manual input.

These methods may enable the user to better control the functions of their vehicle and/or devices while driving, without the need for extended glances away from the road. By lowering the amount of time spent looking off the road, and the amount of time spent with hands-off-wheel, the system should be both easier to operate and safer.

Referring to FIG. 1, in some embodiments of the present disclosure, a system is for providing a method of determining which device 103 the user is attending to such as one or more eye-contact sensors, an object-oriented gaze tracker or a suitably calibrated gaze tracking system; at least one device of: a heads-up display 101, a dash display 102, an infotainment display 104, a mobile phone 108; at minimum a single button input 107 and/or a five-way directional input 106; a speech recognition system running on either the vehicle 105 or other devices 104 and 108; and at least one coordination device, which may be either an additional computing device 105 or one of the existing devices in the system 104 and 107. Additionally, the system may contain trackable objects including but not limited to control knobs, buttons, sliders, switches and/or the like 109 and 110. In some embodiments, control knobs 109 and 110 may be climate control knobs, buttons, sliders, switches and/or the like.

Figure 2:
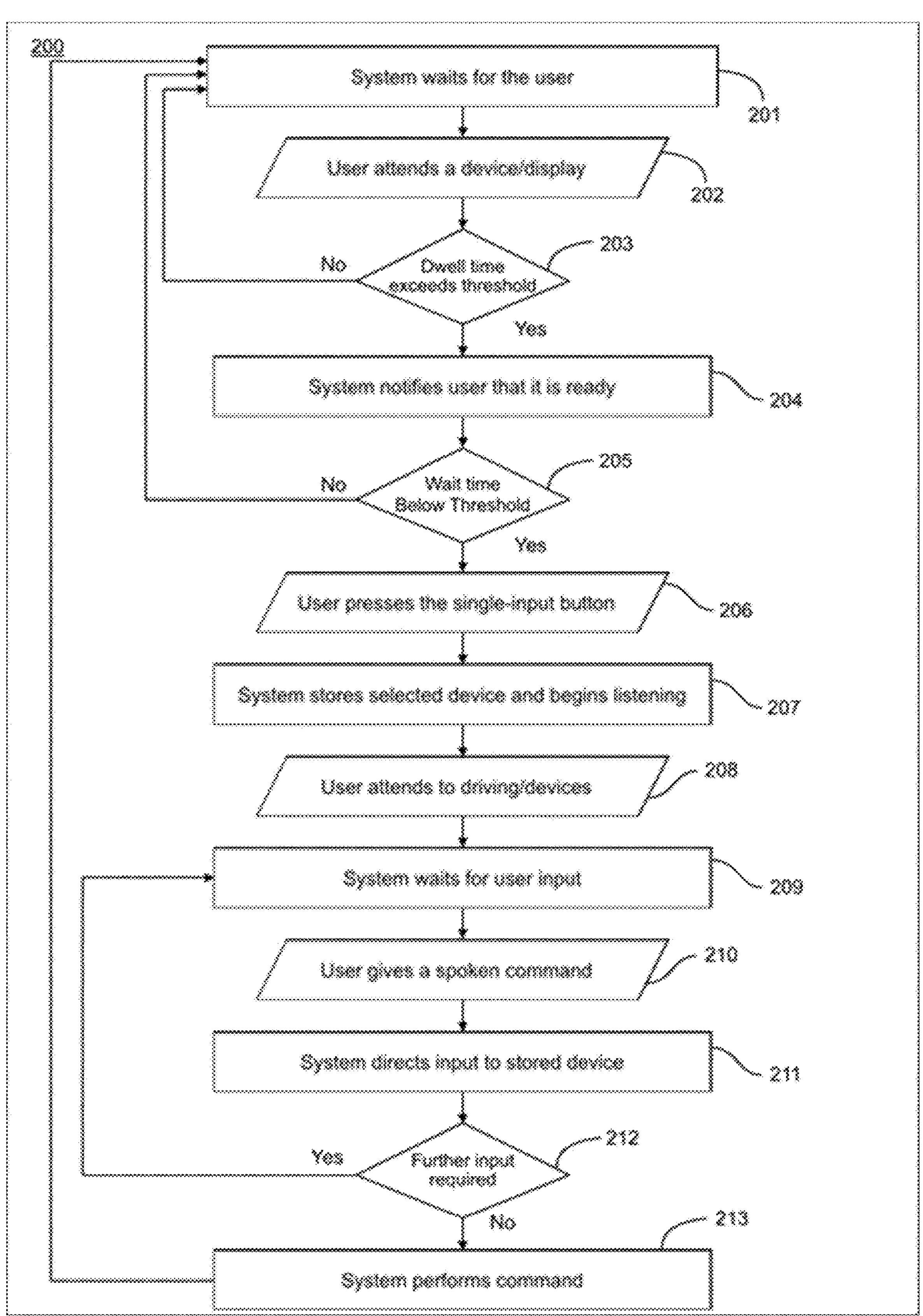
FIG. 2 is a flowchart illustrating an exemplary method of controlling a vehicle according to embodiments disclosed herein.

Referring to FIG. 2, an exemplary method 200 may include the system waiting for a user at step 201, the user attending a device or display at step, the system determining at step 203 if a dwell time has exceed a threshold, the system notifying the user that it is ready at step 204, the system determining at step 205 if a wait time is below a threshold, the user pressing a single-input button at step 206, the system storing a selected device and begin listening at step 207, the user attending to driving and/or devices at step 208, the system waiting for user input at step 209, the user provide a spoken command at step 210, the system directing input to a store device at step 211, the system determining if further input is required at step 212 and the system performing a command at step 213.

Figures 3A, 3B, 3C, 3D:
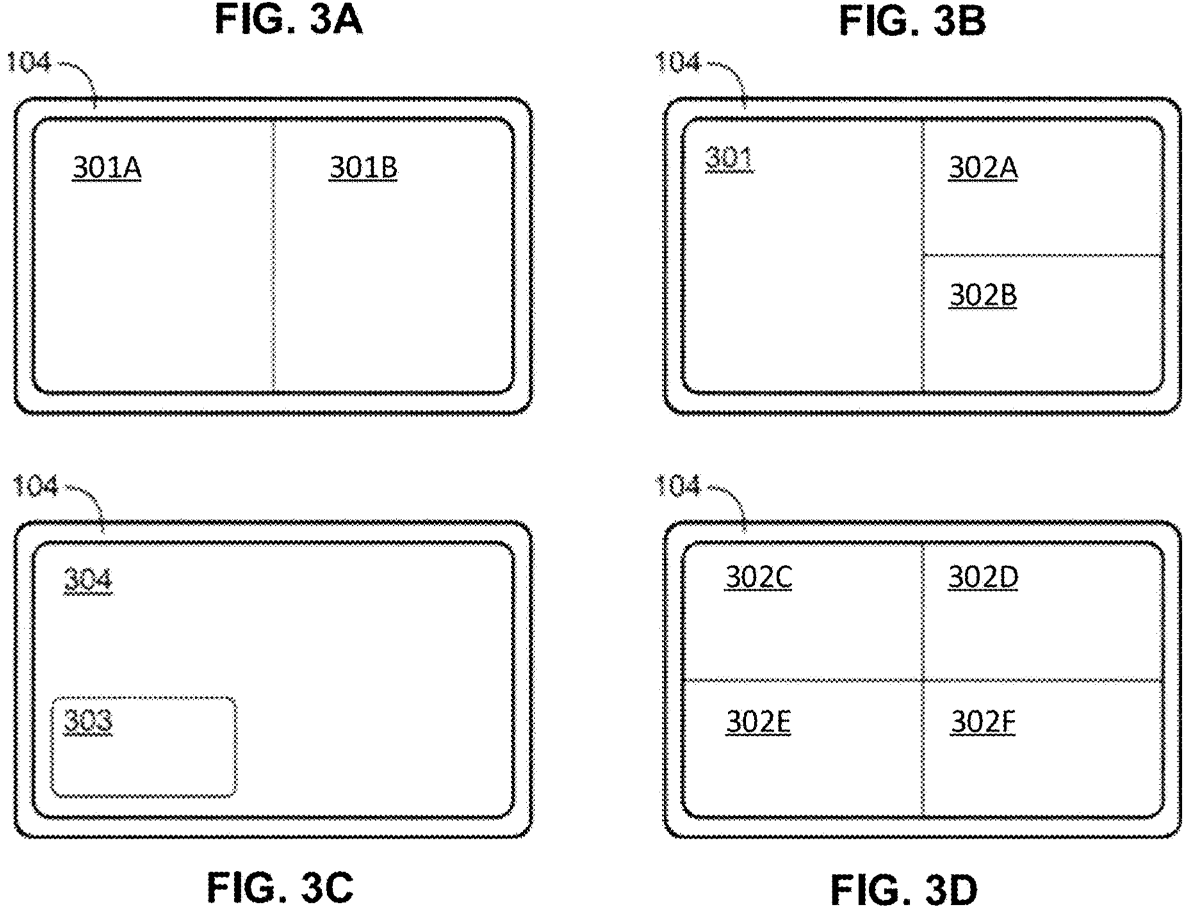
FIGS. 3A to 3D are schematic diagrams of exemplary embodiments of display screen layouts.

Referring to FIG. 3A to FIG. 3D, an exemplary infotainment display 104 inside of a vehicle may comprise many forms, including but not limited to a split screen 301A and 301B either vertically or horizontally as illustrated in FIG. 3A, a three-part display 301, 302A and 302B as illustrated in FIG. 3B, a four-way split display 302C, 302D, 302E and 302F as illustrated in FIG. 3D, or a picture-in-picture (PiP) display 303 as illustrated in FIG. 3C among other embodiments including but not limited to a full screen 304. Each of the embodiments may be considered either separate devices, or separate applications within the device, depending on the granularity of the eye-contact sensing mechanism and the level of integration with the system.

Figure 4:
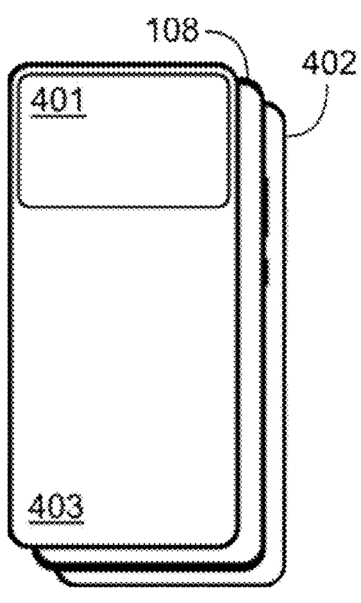
FIG. 4 is a diagram of an exemplary embodiment of a smartphone.

Referring to FIG. 4, a smartphone device 108, of which there may optionally one or more in the system, may be considered to be one physical device, but with several layers for interaction. In some embodiments, there may be a foreground application 403, one or more background applications 402 and an optional PiP window 401.

Figure 5:
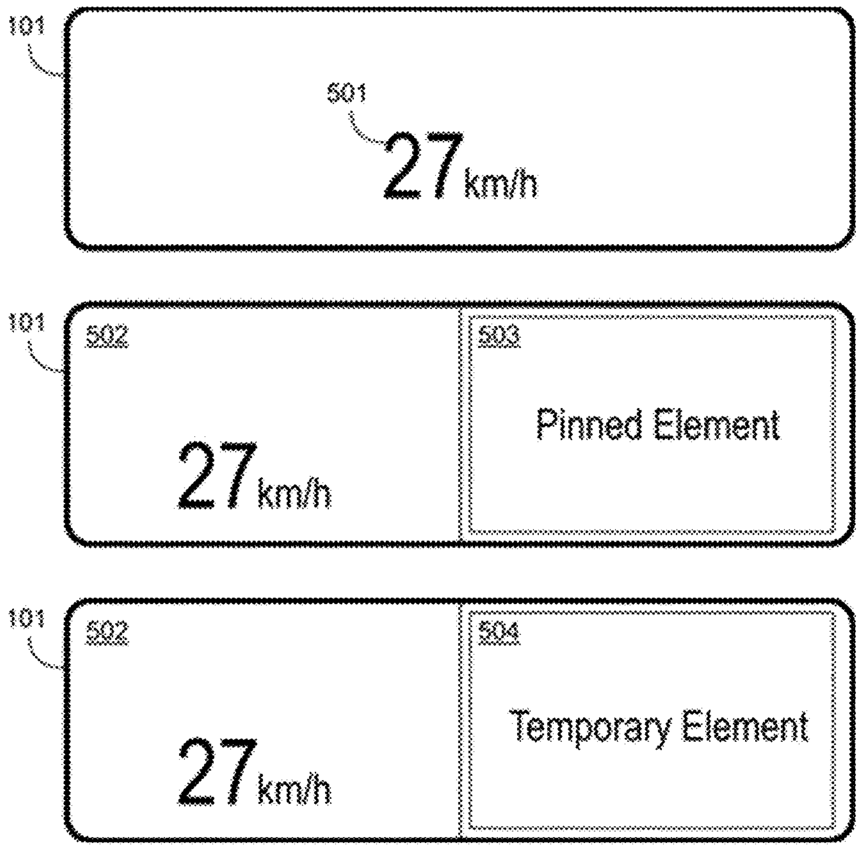
FIG. 5 are schematic diagrams of exemplary embodiments of displays of a heads-up display.

Referring to FIG. 5, a HUD 101 may comprise some system-configured static elements such as a speedometer 501, with the ability to reconfigure its display by creating multiple smaller areas 502 to display elements such as a temporary elements 504 or a pinned element 503. A HUD 101 may contain 1 to N regions, which may be uniform or not.

In some embodiments, smartphones may be used in conjunction with a driving mode or in a car; in-car interfaces either provided as original equipment manufactured; in-car interfaces provided as part of a manufacturer-specific implementation.

Referring to FIG. 1, in some embodiments, a system may comprise at least one device of either the HUD 101, the dash display 102, the infotainment display 104 or a smartphone 108; a device for capturing the gaze 103; a device for processing the gaze and audio information, either separate device 105 or one of the other devices 101, 103 and 104; and at least a single-button input 107.

Referring to FIG. 2, in some embodiments, a method may for the user at step 201, the user may attend a device or display at step 202. If the user's dwell time on that object exceeds some threshold in the system (step 203), which may be approximately 250 ms, then the system may notify the user that it is ready to engage at step 204. This may take the form of an audio notification, a visual indicator, a vibrotactile indicator, some combination of these, or none at all. The user may the press the single-input button at step 206 and the system will store the device and begin listening at step 207.

The listening device may be the first selected device, or it may be a second separate device that will route the audio to the first device for processing, or the second device may process the audio into a command to send to the first device, or the second device may send the audio to some third device for processing, which would in turn send the command to the first device.

Once the user has pressed the single-input button at step 206, the system may be engaged and the user may attend to either, the first device, some second device, the road, or some combination of these at step 208. The system will await user input at step 209. When the user speaks at step 210 the system will interpret the results, with the context of the selected device as input. If further input is needed (such as in a cascade vocal interaction) the system will return to waiting for user input at step 209. Otherwise, the system will then execute the command at step 213 on either the first device, or other as appropriate based on the context of the command.

The user may cancel the interaction, returning the system to step 201 by clicking the single input button while not looking at any device (for example, while looking out the windshield).

The user may cancel in the interaction on a first device, and start it on a second device, by pressing the single-input button while gazing at a second device after having engaged the system as per above. The system will may then move to begin listening at step 207, with this second device selected.

In some embodiments, the user may perform a cascaded or multi-part interaction across multiple devices. To do this, the user may begin the interaction on a first device as discussed above, and then move their gaze to a second device, pressing again the single-input button, and finishing the command. In this embodiment, instead of discarding the command as per the cancel routine above, the routine is stored and checked against a database of two-part commands. This interaction may be performed across any number of devices.

In some embodiments, the system or method may additionally distinguish between sections of a display, such as in the case of a large infotainment display, which runs separate elements such that they may be considered distinct devices. Divisions of a screen may be considered separate devices, such as illustrated in FIG. 3A to 3D. Cross-device interactions may be optionally performed on such displays.

Referring to FIG. 1, in some embodiments, a system comprises at least the HUD 101; at least one other device of the car dash display 102, the infotainment display 104, a smartphone 108, or other car control device such as climate control knobs 109 and 110; a two or four-way button and a single-input button, or a five-way button with optional single-input button 106; a device for tracking the user's gaze; and a system for management.

The system may maintain a memory of the last-gazed-at device, and if the user looks at that device for at least some defined dwell time, and then to the HUD region, within a specified amount of time and then for some specified dwell time, may show a digital representation of either the: car function that is represented by that device (in the case of a climate knob, the interior car temperature) or if the device is capable of running applications, content contextual to that, or if the device is running an application in the background, information contextual to that, or if the device is running an application in the foreground, information contextual to that, with foreground applications overruling background applications 504.

Optionally, when a device is running multiple applications 402 and 403, a list may be scrolled with the directional buttons 106.

The user may choose to interact with this element by looking at the HUD and performing a contextual command including but not limited to: using the up and down buttons to change a value, using the left and right arrows to seek forward and backward, pressing the enter or single-input button to cause that element to remain in the HUD after they look away 503.

In some embodiments, the HUD has the additional capability of sectioning itself into N segments, detectable as different look zones, where N>1. In such embodiments, multiple elements may be emplaced in the HUD using the methods disclosed herein.

In some embodiments, the dash display 102 may comprise the display area instead of the HUD.

As used herein, a "device" is a term of explanation referring to a hardware structure such as a circuitry implemented using technologies such as electrical and/or optical technologies (and with more specific examples of semiconductors) for performing defined operations or processings. A "device" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As used herein, the device may be a part of an apparatus, a system, and/or the like, wherein the device may be coupled to or integrated with other parts of the apparatus, or system such that the combination thereof forms the apparatus, or system.

The device executes a process for performing. Herein, a process has a general meaning equivalent to that of a method, and does not necessarily correspond to the concept of computing process (which is the instance of a computer program being executed). More specifically, a process herein is a defined method implemented using hardware components for process data. A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the method disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. The device may read the computer-executable code from the storage devices and execute the computer-executable code to perform the methods disclosed herein.

Alternatively, the methods disclosed herein may be implemented as one or more hardware structures having necessary electrical and/or optical components, circuits, logic gates, integrated circuit (IC) chips, and/or the like.

The devices may be computing devices that may be portable and/or non-portable computing devices such as laptop computers, tablets, smartphones, Personal Digital Assistants (PDAs), desktop computers, smart devices, and/or the like. Each computing device may execute one or more client application programs which sometimes may be called "apps".

Figure 6:
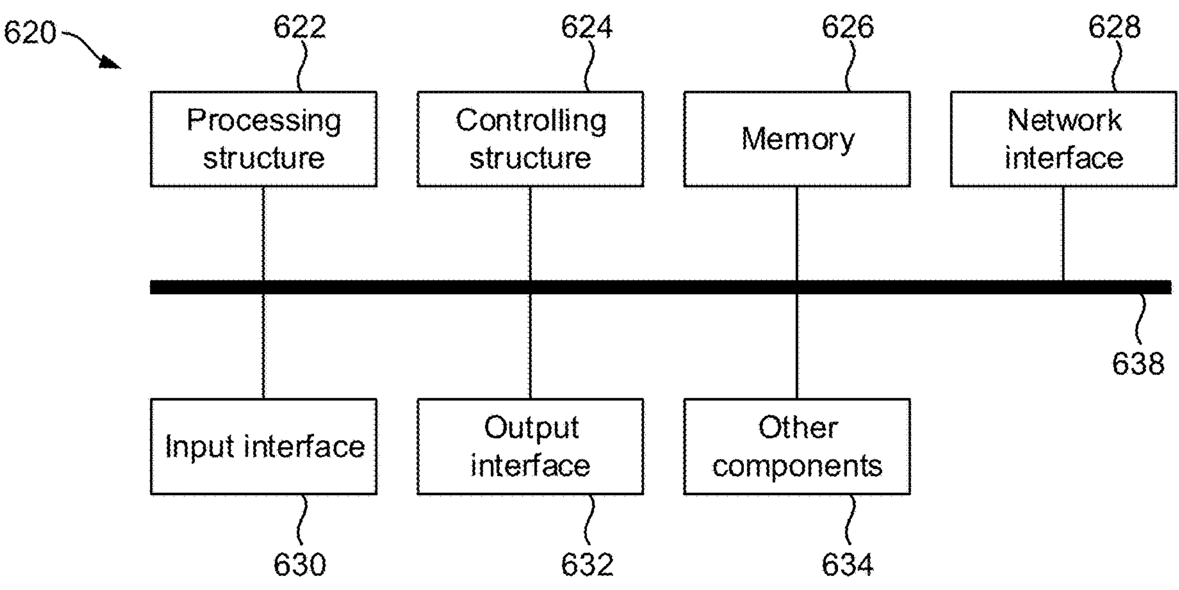
FIG. 6 is a schematic diagram showing a simplified hardware structure of an exemplary computing device.

Generally, the computing devices comprise similar hardware structures such as hardware structure 620 shown in FIG. 6. As shown, the hardware structure 620 comprises a processing structure 622, a controlling structure 624, one or more non-transitory computer-readable memory or storage devices 626, a network interface 628, an input interface 630, and an output interface 632, functionally interconnected by a system bus 638. The hardware structure 620 may also comprise other components 634 coupled to the system bus 638.

The processing structure 622 may be one or more single-core or multiple-core computing processors, generally referred to as central processing units (CPUs). When the processing structure 622 comprises a plurality of processors, the processors thereof may collaborate via a specialized circuit such as a specialized bus or via the system bus 638.

The processing structure 622 may also comprise one or more real-time processors, programmable logic controllers (PLCs), microcontroller units (MCUs), u-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

Generally, the processing structure 622 comprises necessary circuitry implemented using technologies such as electrical and/or optical hardware components for executing transformer related processes.

For example, the processing structure 622 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "O" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processing structure 622, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processing structure 622 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processing structure 622 is usually of no use without meaningful firmware and/or software.

Of course, those skilled in the art will appreciate that a process or a function (and thus the processor) may be implemented using other technologies such as analog technologies.

Referring back to FIG. 6, the controlling structure 624 comprises one or more controlling circuits, such as graphic controllers, input/output chipsets and the like, for coordinating operations of various hardware components and modules of the computing device.

The memory 626 comprises one or more storage devices or media accessible by the processing structure 622 and the controlling structure 624 for reading and/or storing instructions for the processing structure 622 to execute, and for reading and/or storing data, including input data and data generated by the processing structure 622 and the controlling structure 624. The memory 626 may be volatile and/or non-volatile, non-removable or removable memory such as RAM, ROM, EEPROM, solid-state memory, hard disks, CD, DVD, flash memory, or the like.

The input interface 630 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 630 may be a physically integrated part of the computing device (for example, the touch-pad of a laptop computer or the touch-sensitive screen of a tablet), or may be a device physically separate from, but functionally coupled to, other components of the computing device (for example, a computer mouse). The input interface 630, in some implementation, may be integrated with a display output to form a touch-sensitive screen or touch-sensitive whiteboard.

The output interface 632 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 632 may be a physically integrated part of the computing device (for example, the display of a laptop computer or tablet), or may be a device physically separate from but functionally coupled to other components of the computing device (for example, the monitor of a desktop computer).

The system bus 638 interconnects various components 622 to 634 enabling them to transmit and receive data and control signals to and from each other.

Figure 7:
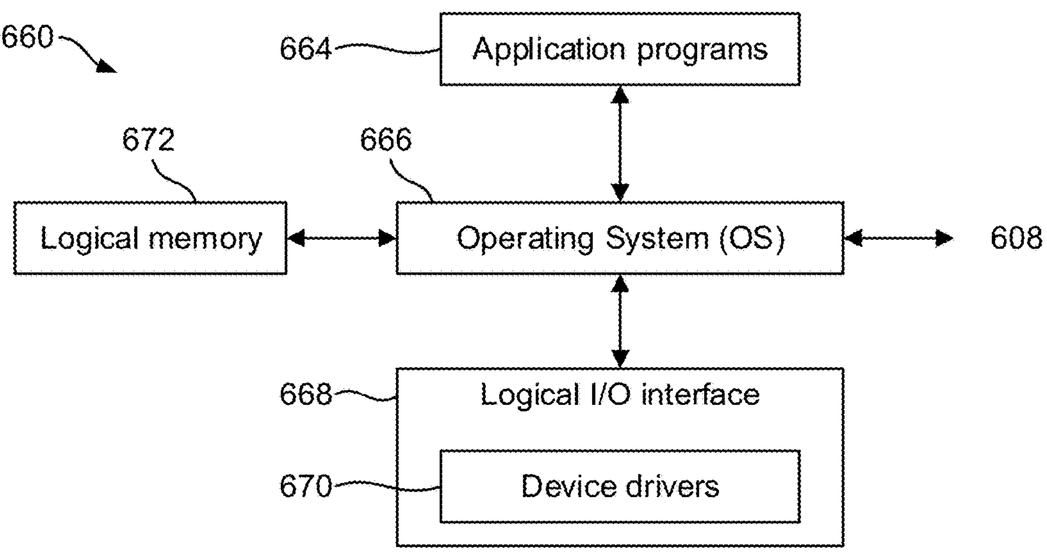
FIG. 7 is a schematic diagram showing a simplified software architecture of an exemplary computing device.

FIG. 7 shows a simplified software architecture 660 of the computing device. The software architecture 660 comprises one or more application programs 664, an operating system 666, a logical input/output (I/O) interface 668, and a logical memory 672. The one or more application programs 664, operating system 666, and logical I/O interface 668 are generally implemented as computer-executable instructions or code in the form of software programs or firmware programs stored in the logical memory 672 which may be executed by the processing structure 622.

The one or more application programs 664 executed by or run by the processing structure 622 for performing various tasks such as the methods disclosed herein.

The operating system 666 manages various hardware components of the computing device 602 or 604 via the logical I/O interface 668, manages the logical memory 672, and manages and supports the application programs 664. The operating system 666 is also in communication with other computing devices (not shown) via the network 608 to allow application programs 664 to communicate with those running on other computing devices. As those skilled in the art will appreciate, the operating system 666 may be any suitable operating system.

The logical I/O interface 668 comprises one or more device drivers 670 for communicating with respective input and output interfaces 630 and 632 for receiving data therefrom and sending data thereto. Received data may be sent to the one or more application programs 664 for being processed by one or more application programs 664. Data generated by the application programs 664 may be sent to the logical I/O interface 668 for outputting to various output devices (via the output interface 632).

The logical memory 672 is a logical mapping of the physical memory 626 for facilitating the application programs 664 to access. In this embodiment, the logical memory 672 comprises a storage memory area that may be mapped to a non-volatile physical memory such as hard disks, solid-state disks, flash drives, and the like, generally for long-term data storage therein. The logical memory 672 also comprises a working memory area that is generally mapped to high-speed, and in some implementations volatile, physical memory such as RAM, generally for application programs 664 to temporarily store data during program execution. For example, an application program 664 may load data from the storage memory area into the working memory area, and may store data generated during its execution into the working memory area. The application program 664 may also store some data into the storage memory area as required or in response to a user's command.

Figure 8:
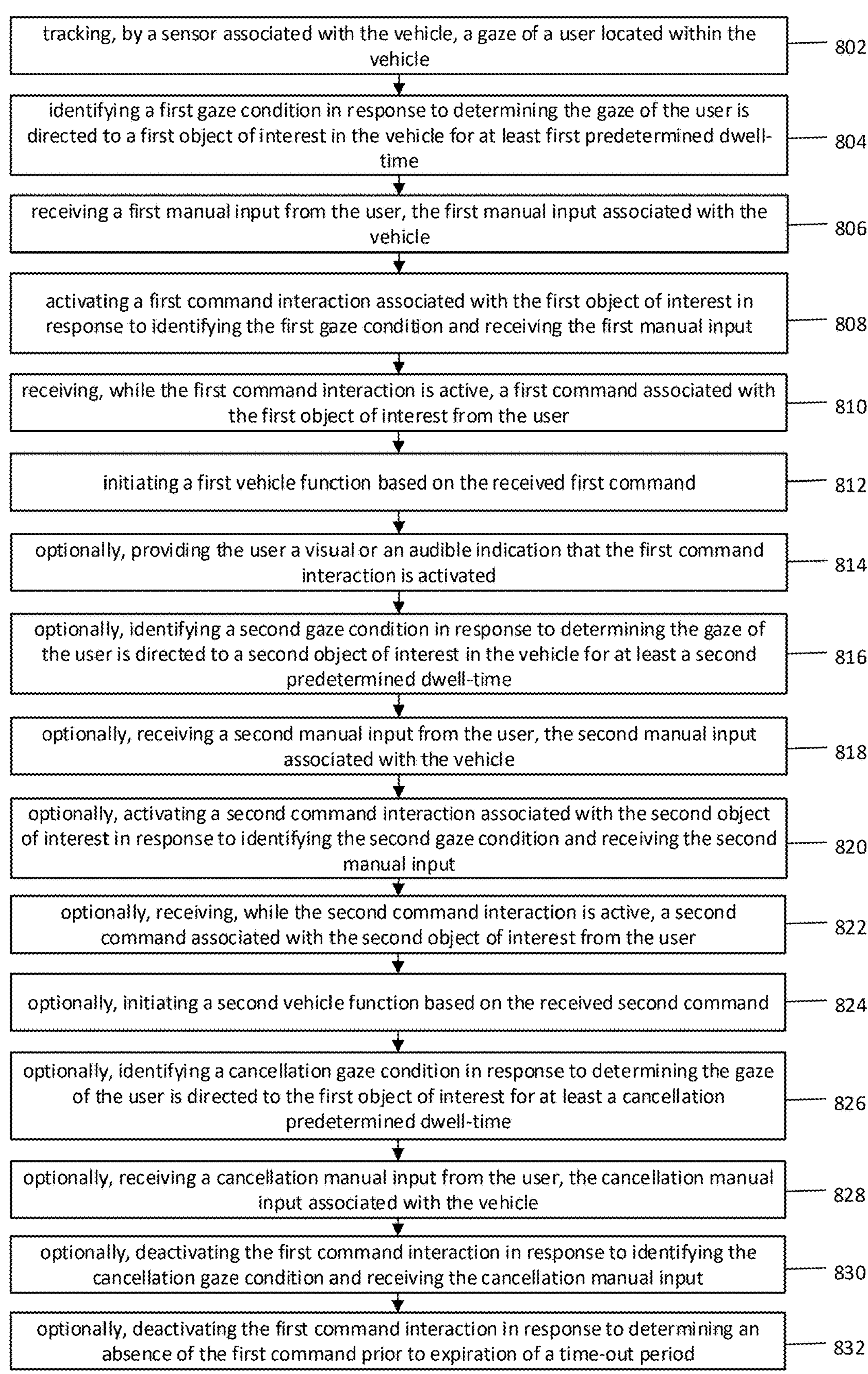
FIG. 8 is a flowchart illustrating a method according to embodiments of the present disclosure; and FIG. 9A

FIG. 8 is a flowchart showing the steps of a method 800, according to some embodiments of the present disclosure. The method 800 begins with tracking, by a sensor associated with the vehicle, a gaze of a user located within the vehicle (step 804). At step 804 the method comprises, identifying a first gaze condition in response to determining the gaze of the user is directed to a first object of interest in the vehicle for at least first predetermined dwell-time. At step 806 the method comprises, receiving a first manual input from the user, the first manual input associated with the vehicle. At step 808 the method comprises, activating a first command interaction associated with the first object of interest in response to identifying the first gaze condition and receiving the first manual input. At step 810 the method comprises, receiving, while the first command interaction is active, a first command associated with the first object of interest from the user. At step 812 the method comprises, initiating a first vehicle function based on the received first command. At step 814 the method comprises, optionally, providing the user a visual or an audible indication that the first command interaction is activated. At step 816 the method comprises, optionally, identifying a second gaze condition in response to determining the gaze of the user is directed to a second object of interest in the vehicle for at least a second predetermined dwell-time. At step 818 the method comprises, optionally, receiving a second manual input from the user, the second manual input associated with the vehicle. At step 820 the method comprises, optionally, activating a second command interaction associated with the second object of interest in response to identifying the second gaze condition and receiving the second manual input. At step 822 the method comprises, optionally, receiving, while the second command interaction is active, a second command associated with the second object of interest from the user. At step 824 the method comprises, optionally, initiating a second vehicle function based on the received second command. At step 826 the method comprises, optionally, identifying a cancellation gaze condition in response to determining the gaze of the user is directed to the first object of interest for at least a cancellation predetermined dwell-time. At step 828 the method comprises, optionally, receiving a cancellation manual input from the user, the cancellation manual input associated with the vehicle. At step 830 the method comprises, optionally, deactivating the first command interaction in response to identifying the cancellation gaze condition and receiving the cancellation manual input. At step 832 the method comprises, optionally, deactivating the first command interaction in response to determining an absence of the first command prior to expiration of a time-out period.

Figure 9A:
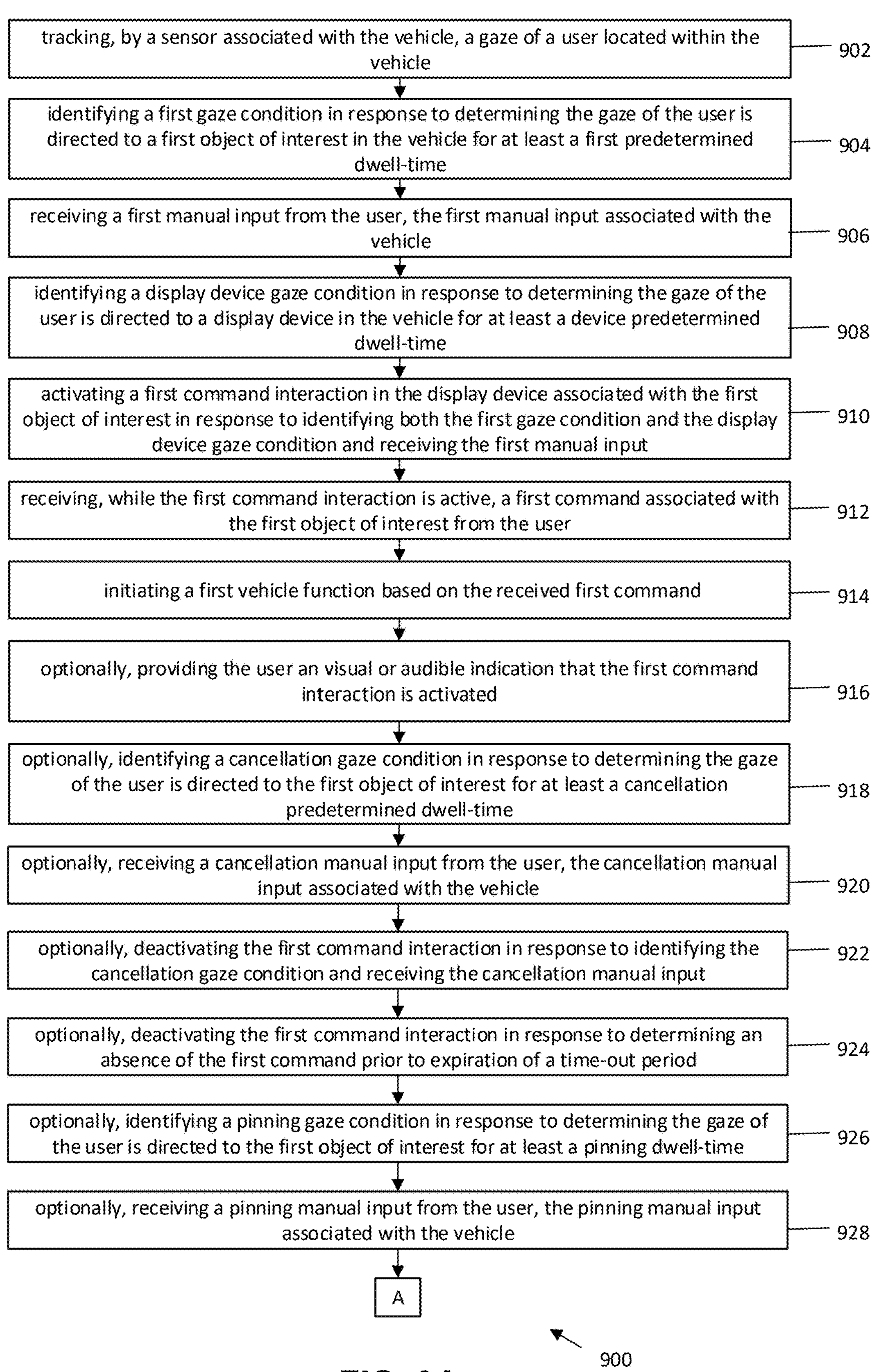
FIG. 9B is a flowchart illustrating a method according to embodiments of the present disclosure.
Figure 9B:
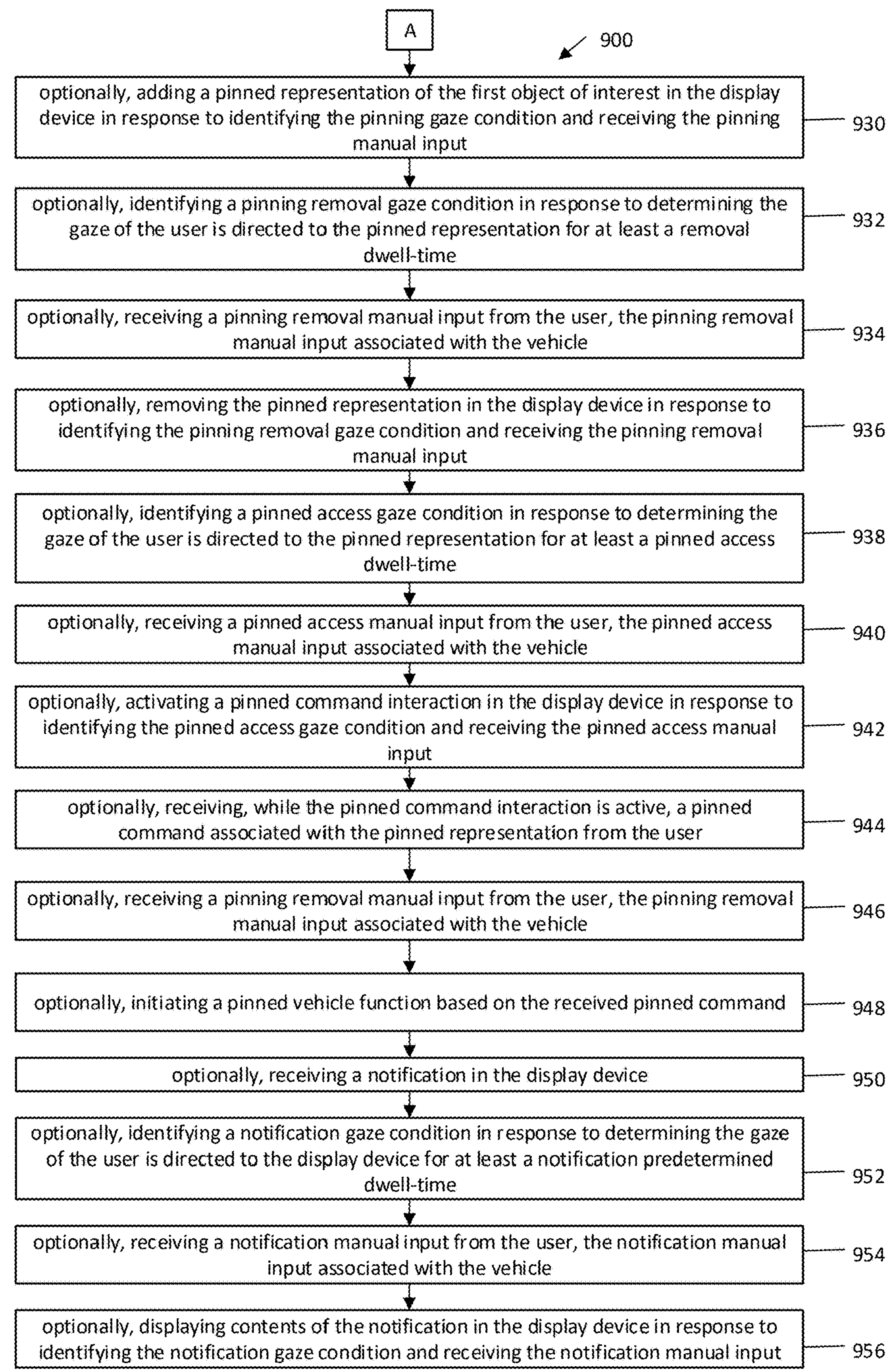

FIG. 9 is a flowchart showing the steps of a method 900, according to some embodiments of the present disclosure. The method 900 begins with tracking, by a sensor associated with the vehicle, a gaze of a user located within the vehicle (step 902). At step 904 the method comprises, identifying a first gaze condition in response to determining the gaze of the user is directed to a first object of interest in the vehicle for at least a first predetermined dwell-time. At step 906 the method comprises, receiving a first manual input from the user, the first manual input associated with the vehicle. At step 908 the method comprises, identifying a display device gaze condition in response to determining the gaze of the user is directed to a display device in the vehicle for at least a device predetermined dwell-time. At step 910 the method comprises, activating a first command interaction in the display device associated with the first object of interest in response to identifying both the first gaze condition and the display device gaze condition and receiving the first manual input. At step 912 the method comprises, receiving, while the first command interaction is active, a first command associated with the first object of interest from the user. At step 914 the method comprises, initiating a first vehicle function based on the received first command. At step 916 the method comprises, optionally, providing the user an visual or audible indication that the first command interaction is activated. At step 918 the method comprises, optionally, identifying a cancellation gaze condition in response to determining the gaze of the user is directed to the first object of interest for at least a cancellation predetermined dwell-time. At step 920 the method comprises, optionally, receiving a cancellation manual input from the user, the cancellation manual input associated with the vehicle. At step 922 the method comprises, optionally, deactivating the first command interaction in response to identifying the cancellation gaze condition and receiving the cancellation manual input. At step 924 the method comprises, optionally, deactivating the first command interaction in response to determining an absence of the first command prior to expiration of a time-out period. At step 926 the method comprises, optionally, identifying a pinning gaze condition in response to determining the gaze of the user is directed to the first object of interest for at least a pinning dwell-time. At step 928 the method comprises, optionally, receiving a pinning manual input from the user, the pinning manual input associated with the vehicle. At step 930 the method comprises, optionally, adding a pinned representation of the first object of interest in the display device in response to identifying the pinning gaze condition and receiving the pinning manual input. At step 932 the method comprises, optionally, identifying a pinning removal gaze condition in response to determining the gaze of the user is directed to the pinned representation for at least a removal dwell-time. At step 934 the method comprises, optionally, receiving a pinning removal manual input from the user, the pinning removal manual input associated with the vehicle. At step 936 the method comprises, optionally, removing the pinned representation in the display device in response to identifying the pinning removal gaze condition and receiving the pinning removal manual input. At step 938 the method comprises, optionally, identifying a pinned access gaze condition in response to determining the gaze of the user is directed to the pinned representation for at least a pinned access dwell-time. At step 940 the method comprises, optionally, receiving a pinned access manual input from the user, the pinned access manual input associated with the vehicle. At step 942 the method comprises, optionally, activating a pinned command interaction in the display device in response to identifying the pinned access gaze condition and receiving the pinned access manual input. At step 944 the method comprises, optionally, receiving, while the pinned command interaction is active, a pinned command associated with the pinned representation from the user. At step 946 the method comprises, optionally, receiving a pinning removal manual input from the user, the pinning removal manual input associated with the vehicle. At step 948 the method comprises, optionally, initiating a pinned vehicle function based on the received pinned command. At step 950 the method comprises, optionally, receiving a notification in the display device. At step 952 the method comprises, optionally, identifying a notification gaze condition in response to determining the gaze of the user is directed to the display device for at least a notification predetermined dwell-time. At step 954 the method comprises, optionally, receiving a notification manual input from the user, the notification manual input associated with the vehicle. At step 956 the method comprises, optionally, displaying contents of the notification in the display device in response to identifying the notification gaze condition and receiving the notification manual input.

Embodiments have been described above in conjunctions with aspects of the present invention upon which they may be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations may be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of gaze-based control of vehicle functions, the method comprising:

tracking, by a sensor associated with the vehicle, a gaze of a user located within the vehicle;

identifying a first gaze condition in response to determining that the gaze of the user is directed to a first object of interest in the vehicle for at least a first predetermined dwell-time;

receiving a first manual input from the user, the first manual input associated with the vehicle;

identifying a display device gaze condition in response to determining that the gaze of the user is directed to a display device in the vehicle for at least a device predetermined dwell-time;

activating a first command interaction in the display device associated with the first object of interest in response to identifying both the first gaze condition and the display device gaze condition and receiving the first manual input;

receiving, while the first command interaction is active, a first command associated with the first object of interest from the user;

initiating a first vehicle function based on the received first command;

deactivating the first command interaction in response to determining an absence of the first command prior to expiration of a time-out period;

identifying a pinning gaze condition in response to determining that the gaze of the user is directed to the first object of interest for at least a pinning dwell-time;

receiving a pinning manual input from the user, the pinning manual input associated with the vehicle; and adding a pinned representation of a display element associated with the first object of interest in the display device in response to identifying the pinning gaze condition and receiving the pinning manual input.

2. The method of claim 1, wherein activating the first command interaction further comprises providing the user a visual or an audible indication that the first command interaction is activated.

3. The method of claim 1 wherein the first command is a first voice command.

4. The method of claim 1 further comprising:

identifying a second gaze condition in response to determining that the gaze of the user is directed to a second object of interest in the vehicle for at least a second predetermined dwell-time;

receiving a second manual input from the user, the second manual input associated with the vehicle;

activating a second command interaction associated with the second object of interest in response to identifying the second gaze condition and receiving the second manual input;

receiving, while the second command interaction is active, a second command associated with the second object of interest from the user; and initiating a second vehicle function based on a combination of the received first and second commands.

5. The method of claim 1 further comprising:

identifying a cancellation gaze condition in response to determining that the gaze of the user is directed to the first object of interest for at least a cancellation predetermined dwell-time;

receiving a cancellation manual input from the user, the cancellation manual input associated with the vehicle; and deactivating the first command interaction in response to identifying the cancellation gaze condition and receiving the cancellation manual input.

6. The method of claim 1, wherein the first object of interest is at least one of a gauge cluster, a dash display, a heads up display, and an infotainment console.

7. The method of claim 1 further comprising:

identifying a pinning removal gaze condition in response to determining that the gaze of the user is directed to the pinned representation for at least a removal dwell-time;

receiving a pinning removal manual input from the user, the pinning removal manual input associated with the vehicle; and removing the pinned representation in the display device in response to identifying the pinning removal gaze condition and receiving the pinning removal manual input.

8. The method of claim 1 further comprising:

identifying a pinned access gaze condition in response to determining that the gaze of the user is directed to the pinned representation for at least a pinned access dwell-time;

receiving a pinned access manual input from the user, the pinned access manual input associated with the vehicle;

activating a pinned command interaction in the display device in response to identifying the pinned access gaze condition and receiving the pinned access manual input;

receiving, while the pinned command interaction is active, a pinned command associated with the pinned representation from the user; and initiating a pinned vehicle function based on the received pinned command.

9. The method of claim 1 further comprising:

receiving a notification in the display device;

identifying a notification gaze condition in response to determining that the gaze of the user is directed to the display device for at least a notification predetermined dwell-time;

receiving a notification manual input from the user, the notification manual input associated with the vehicle; and displaying contents of the notification in the display device in response to identifying the notification gaze condition and receiving the notification manual input.

10. A system for gaze-based control of vehicle functions comprising:

one or more eye contact sensors for monitoring one or both eyes of a user;

one or more manual input devices; and one or more processors configured to perform operations including:

tracking a gaze of a user located within a vehicle;

identifying a first gaze condition from the one or more eye contact sensors in response to determining that the gaze of the user is directed to a first object of interest in the vehicle for at least a first predetermined dwell-time;

receiving a first manual input from the one or more manual input devices;

identifying a display device gaze condition in response to determining that the gaze of the user is directed to a display device in the vehicle for at least a device predetermined dwell-time;

activating a first command interaction in the display device associated with the first object of interest in response to identifying both the first gaze condition and the display device gaze condition and receiving the first manual input;

receiving, while the first command interaction is active, a first command associated with the first object of interest from the user; and initiating a first vehicle function based on the received first command;

deactivating the first command interaction in response to determining an absence of the first command prior to expiration of a time-out period;

identifying a pinning gaze condition in response to determining that the gaze of the user is directed to the first object of interest for at least a pinning dwell-time;

receiving a pinning manual input from the user, the pinning manual input associated with the vehicle; and adding a pinned representation of a display element associated with the first object of interest in the display device in response to identifying the pinning gaze condition and receiving the pinning manual input.

11. The system of claim 10, wherein the one or more processors are configured to perform further operations including:

identifying a second gaze condition from the one or more eye contact sensors in response to determining that the gaze of the user is directed to a second object of interest in the vehicle for the predetermined dwell-time;

receiving a second manual input from the one or more manual input devices;

activating a second command interaction associated with the second object of interest in response to identifying the second gaze condition and receiving the second manual input;

receiving, while the second command interaction is active, a second command associated with the second object of interest from the user; and initiating a second vehicle function based on a combination of the received first and second commands.

12. The system of claim 10, wherein the one or more processors are configured to perform further operations including:

identifying a cancellation gaze condition from the one or more eye contact sensors in response to determining that the gaze of the user is directed to the first object of interest for at least a cancellation predetermined dwell-time;

receiving a cancellation manual input from the one or more manual input devices; and deactivating the first command interaction in response to identifying the cancellation gaze condition and receiving the cancellation manual input.

13. The system of claim 10 wherein said identifying the first gaze condition in response to said determining that the gaze of the user is directed to the first object of interest in the vehicle for at least the first predetermined dwell-time comprises:

identifying a display device gaze condition in response to said determining that the gaze of the user is directed to a display device in the vehicle for at least a device predetermined dwell-time;

wherein said activating the first command interaction associated with the first object of interest in response to identifying the first gaze condition and receiving the first manual input comprises:

activating the first command interaction in the display device associated with the first object of interest in response to identifying both the first gaze condition and the display device gaze condition and receiving the first manual input.

14. One or more non-transitory, computer-readable storage media comprising computer-executable instructions, wherein the instructions, when executed, cause one or more processors to perform actions comprising:

tracking, by a sensor associated with the vehicle, a gaze of a user located within the vehicle;

identifying a first gaze condition in response to determining that the gaze of the user is directed to a first object of interest in the vehicle for at least a first predetermined dwell-time;

receiving a first manual input from the user, the first manual input associated with the vehicle;

identifying a display device gaze condition in response to determining that the gaze of the user is directed to a display device in the vehicle for at least a device predetermined dwell-time;

activating a first command interaction in the display device associated with the first object of interest in response to identifying both the first gaze condition and the display device gaze condition and receiving the first manual input;

receiving, while the first command interaction is active, a first command associated with the first object of interest from the user;

initiating a first vehicle function based on the received first command;

deactivating the first command interaction in response to determining an absence of the first command prior to expiration of a time-out period;

identifying a pinning gaze condition in response to determining that the gaze of the user is directed to the first object of interest for at least a pinning dwell-time;

receiving a pinning manual input from the user, the pinning manual input associated with the vehicle; and adding a pinned representation of a display element associated with the first object of interest in the display device in response to identifying the pinning gaze condition and receiving the pinning manual input.

15. The one or more non-transitory, computer-readable storage media of claim 14, wherein the instructions, when executed, cause the one or more processors to perform further actions further comprising:

identifying a second gaze condition in response to determining that the gaze of the user is directed to a second object of interest in the vehicle for at least a second predetermined dwell-time;

receiving a second manual input from the user, the second manual input associated with the vehicle;

activating a second command interaction associated with the second object of interest in response to identifying the second gaze condition and receiving the second manual input;

receiving, while the second command interaction is active, a second command associated with the second object of interest from the user; and initiating a second vehicle function based on the received second command.

16. The one or more non-transitory, computer-readable storage media of claim 14, wherein the instructions, when executed, cause the one or more processors to perform further actions further comprising:

identifying a cancellation gaze condition in response to determining that the gaze of the user is directed to the first object of interest for at least a cancellation predetermined dwell-time;

receiving a cancellation manual input from the user, the cancellation manual input associated with the vehicle; and deactivating the first command interaction in response to identifying the cancellation gaze condition and receiving the cancellation manual input.

17. The one or more non-transitory, computer-readable storage media of claim 14, wherein the instructions, when executed, cause the one or more processors to perform further actions comprising:

identifying a pinning removal gaze condition in response to determining that the gaze of the user is directed to the pinned representation for at least a removal dwell-time;

receiving a pinning removal manual input from the user, the pinning removal manual input associated with the vehicle; and removing the pinned representation in the display device in response to identifying the pinning removal gaze condition and receiving the pinning removal manual input.

18. The one or more non-transitory, computer-readable storage media of claim 14, wherein the instructions, when executed, cause the one or more processors to perform further actions comprising:

identifying a pinned access gaze condition in response to determining that the gaze of the user is directed to the pinned representation for at least a pinned access dwell-time;

receiving a pinned access manual input from the user, the pinned access manual input associated with the vehicle;

activating a pinned command interaction in the display device in response to identifying the pinned access gaze condition and receiving the pinned access manual input;

receiving, while the pinned command interaction is active, a pinned command associated with the pinned representation from the user; and initiating a pinned vehicle function based on the received pinned command.

19. The one or more non-transitory, computer-readable storage media of claim 14, wherein the instructions, when executed, cause the one or more processors to perform further actions comprising:

receiving a notification in the display device;

identifying a notification gaze condition in response to determining that the gaze of the user is directed to the display device for at least a notification predetermined dwell-time;

receiving a notification manual input from the user, the notification manual input associated with the vehicle; and displaying contents of the notification in the display device in response to identifying the notification gaze condition and receiving the notification manual input.

* * * * *